(12) United States Patent
Liu et al.

(10) Patent No.: US 11,530,972 B2
(45) Date of Patent: Dec. 20, 2022

(54) ANALYZING FRACTURED ROCK SAMPLES

(71) Applicant: Saudi Arabian Oil Company, Dhahran (SA)

(72) Inventors: Hui-Hai Liu, Katy, TX (US); Jilin Zhang, Cypress, TX (US)

(73) Assignee: Saudi Arabian Oil Company, Dhahran (SA)

( * ) Notice: Subject to any disclaimer, the term of this patent is extended or adjusted under 35 U.S.C. 154(b) by 164 days.

(21) Appl. No.: 17/140,214

(22) Filed: Jan. 4, 2021

(65) Prior Publication Data

US 2022/0214261 A1 Jul. 7, 2022

(51) Int. Cl.
G01N 15/08 (2006.01)
E21B 49/00 (2006.01)

(52) U.S. Cl.
CPC ....... *G01N 15/0826* (2013.01); *E21B 49/008* (2013.01)

(58) Field of Classification Search
CPC .... G01N 15/00; G01N 15/08; G01N 15/0826; G01N 33/00; G01N 33/24; E21B 49/00
See application file for complete search history.

(56) References Cited

U.S. PATENT DOCUMENTS

| | | |
|---|---|---|
| 4,389,878 A | 6/1983 | Manzie, Jr. |
| 2018/0106708 A1* | 4/2018 | Siebrits ................ G06G 7/50 |
| 2018/0348111 A1 | 12/2018 | Hannon |
| 2019/0087939 A1* | 3/2019 | Hakimuddin .......... G06T 5/003 |
| 2019/0226970 A1 | 7/2019 | Dusterhoft et al. |

FOREIGN PATENT DOCUMENTS

CN 110470581 11/2019

OTHER PUBLICATIONS

PCT International Search Report and Written Opinion in International Appln. No. PCT/US2022/011145, dated May 9, 2022, 14 pages.

(Continued)

*Primary Examiner* — Nguyen Q. Ha
(74) *Attorney, Agent, or Firm* — Fish & Richardson P.C.

(57) ABSTRACT

The present disclosure describes methods and systems, including computer-implemented methods, computer program products, and computer systems, for analyzing a rock sample from a hydrocarbon reservoir. One method includes: subjecting the rock sample to a first effective stress without exceeding the effective stress under reservoir conditions of the hydrocarbon reservoir; measuring a first permeability of the sample at the first effective stress; increasing the effective stress on the sample to a second effective stress without exceeding the effective stress under reservoir conditions of the hydrocarbon reservoir; measuring a second permeability of the sample at the second effective stress; reducing the effective stress on the sample from the second effective stress to a third effective stress without exceeding the effective stress under reservoir conditions of the hydrocarbon reservoir; measuring a third permeability of the sample at the third effective stress; and distinguishing between a natural fracture and an artificial fracture in the sample based on the first and third permeabilities.

20 Claims, 4 Drawing Sheets

(56) References Cited

OTHER PUBLICATIONS

Gale, "Effects of Fracture Type (Induced) Versus Natural) on the Stress-Fracture Closure-Fracture Permeability Relationships," Proceedings 23rd Symposium on Rock Mechanics, Dec. 1982, Chapter 30, 290-298, 9 pages.

Abdelmalek et al., "Gas permeability measurements from pressure pulse decay laboratory data using pseudo-pressure and pseudo-time transformations." Journal of Petroleum Exploration and Production Technology 8.3, Jul. 2017, 839-847, 9 pages.

Alnoaimi and Kovscek, "Experimental and Numerical Analysis of Gas Transport in Shale including the Role of Sorption," Papter SPE 166375, presented at the SPE Annual Technical Conference and Exhibition, Sep. 30-Oct. 2, 2013, 16 pages.

An et al., "A new study of magnetic nanoparticle transport and quantifying magnetization analysis in fractured shale reservoir using numerical modeling," Journal of Natural Gas Science and Engineering, vol. 28, Jan. 2016, 21 pages.

Basu et al., "Best Practices for Shale Core Handling: Transporation, Sampling and Storage for Conduction of Analyses," Journal of Marine Science and Engineering, MDPI, 8(136), Feb. 2020, 18 pages.

Bhandari et al.,"Permeability Behavior and the Effective Stress Law for a Partially Fractured Eagle Ford Shale Sample." Poromechanics VI. 2017, 3 pages.

Bourbie and Walls, "Pulse decay permeability: analytical solution and experimental test," SPE Journal, vol. 22, No. 5, Oct. 1982, 11 pages.

Brace et al., "Permeability of granite under high pressure," Journal of Geophysics Res. vol. 73, No. 6, Mar. 15, 1968, 12 pages.

Brezovski and Cui, "Laboratory permeability measurements of unconventional reservoirs: useless or full of information? A montney example from the western Canadian sedimentary basin," Society of Petroleum Engineers, presented at the SPE Unconventional Resources Conference and Exhibition—Asia Pacific, Nov. 11-13, 2013, 12 pages.

Cronin, "Core-scale heterogeneity and dual-permeability pore structures in the Barnett Shale," Thesis for Degree of Master of Science in Geological Sciences at the University of Texas at Austin, Dec. 2014, 174 pages.

Cui et al., "Measurements of gas permeability and diffusivity of tight reservoir rocks: different approaches and their applications," Geofluids, vol. 9, No. 3, Aug. 2009, presented at the AAPG Convention, Jun. 7-10, 2009, 18 pages.

Darabi et al., "Gas flow in ultra-tight shale strata," Journal of Fluid Mechanics, vol. 710, Nov. 10, 2012, 20 pages.

Dicker and Smits, "A practical approach for determining permeability from laboratory pressure-pulse decay measurements," SPE-17578, Society of Petroleum Engineers, Nov. 1-4, 1988, 8 pages.

Egermann et al., "A fast and direct method of permeability measurements on drill cuttings," Society of Petroleum Engineers, SPE Reservoir Evaluation and Engineering, vol. 8, No. 4, Aug. 2005, 7 pages.

Finsterle and Persoff, "Determining permeability of tight rock samples using inverse modeling," Water Resources Research, vol. 33, No. 8, Aug. 1997, 9 pages.

Heller et al., "Experimental investigation of matric permeability of gas shale," AAPG Bulletin, vol. 98, No. 5, May 2014, 21 pages.

Jin et al., "Permeability Measurement of Organic-Rich Shale—Comparison of Various Unsteady-State Methods" SPE-175105-MS, Society of Petroleum Engineers, Sep. 2015, 14 pages.

Jones, "A Technique for Faster Pulse-Decay Permeability Measurements in Tight Rocks," presented at the 1994 SPE Annual Technical Conference and Exhibition, Sep. 25-28, 1994, SPE Formation Evaluation, Mar. 1997, 7 pages.

Luffel et al., "Matrix permeability measurement of gas productive shales," SPE-26633-MS, Society of Petroleum Engineers, SPE Annual Technical Conference and Exhibition, Oct. 3-6, 1993, 10 pages.

Ning et al., "The measurement of Matrix and Fracture Properties in Naturally Fractured Cores," SPE-25898, Society of Petroleum Engineers, Low Permeability Reservoirs Symposium, Apr. 26-28, 1993, 15 pages.

ResTech, "Development of labatory and petrophysical techniques for evaluating shale reservoirs," GRI-95/0496, Gas Research Institute, Apr. 1996, 306 pages.

Rydzy et al., "Stressed Permeability in Shales: Effects of Matrix Compressibility and Fractures—A Step Towards Measuring Matrix Permeability in Fractured Shale Samples," SCA2016-027, Aug. 2016, 12 pages.

Thomas et al., "Fractured reservoir simulation," SPE-9305-PA, SPE Journal, vol. 23, No. 1, Feb. 1983, 13 pages.

Trimmer et al., "Effect of pressure and stress on the water transport in intact and fractured gabbro and granite," Journal of Geophysical Research, vol. 85, Dec. 10, 1980, 13 pages.

Warren and Root, "The behavior of naturally fractured reservoirs," SPE-426-PA, SPE Journal, vol. 3, No. 3, Sep. 1963, 11 pages.

Yamada and Jones, "A review of pulse technique for permeability measurements," SPE Journal, vol. 20, No. 5, Oct. 1980, 2 pages.

Yan et al., "General multi-porosity simulation for fractured reservoir modeling," Journal of Natural Gas Science Engineering, vol. 33, Jul. 2016, 15 pages.

* cited by examiner

ANALYZING FRACTURED ROCK SAMPLES

TECHNICAL FIELD

This disclosure relates to the analysis of fractured rock samples.

BACKGROUND

Subsurface formations may include fractures, cracks, or breakages within the rock. Fractures impact the properties of the rock, including, for example, the rock's permeability. Permeability is a measurement of a porous material's ability to transmit fluids and is relevant for hydrocarbon exploration and extraction.

SUMMARY

The present disclosure describes methods and systems, including computer-implemented methods, computer program products, and computer systems, for analyzing a rock sample from a hydrocarbon reservoir. One method includes: subjecting the rock sample to a first effective stress without exceeding the effective stress under reservoir conditions of the hydrocarbon reservoir; measuring a first permeability of the sample at the first effective stress; increasing the effective stress on the sample to a second effective stress without exceeding the effective stress under reservoir conditions of the hydrocarbon reservoir; measuring a second permeability of the sample at the second effective stress; reducing the effective stress on the sample from the second effective stress to a third effective stress without exceeding the effective stress under reservoir conditions of the hydrocarbon reservoir; measuring a third permeability of the sample at the third effective stress; and distinguishing between a natural fracture and an artificial fracture in the sample based on the first and third permeabilities.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes methods and systems for analyzing fractured rock samples. The rock samples may be cylindrical plugs that are cut from core samples obtained during hydrocarbon exploration. For example, the core samples may be collected from an unconventional reservoir. However, this disclosure is also applicable to other types of rock samples or geological formations. The methods and systems may be used to distinguish fractures that exist in the reservoir (natural fractures) from fractures that were formed outside of the reservoir (induced fractures). For example, induced fractures may occur when a rock sample is brought to the surface, which releases the pressure or effective stress on the rock under reservoir conditions. Induced fractures may also be caused when the sample is transported or prepared for laboratory testing.

Figure 1A:
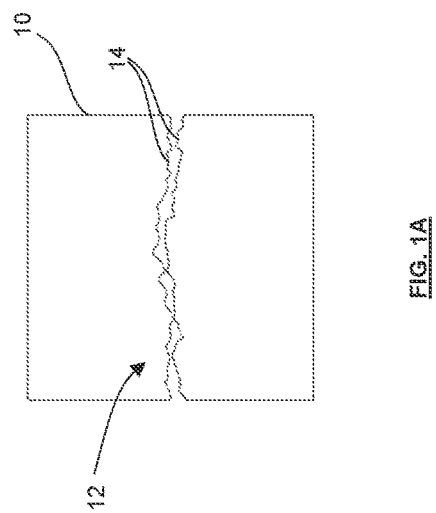
FIG. 1A to 1C are schematic views of an enlarged sample of fractured rock.
Figure 1B:
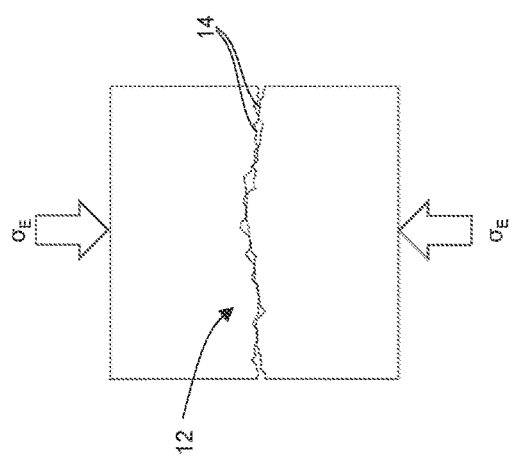
Figure 1C:
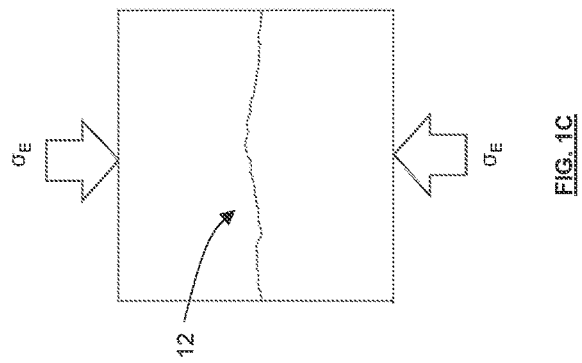

FIG. 1A is a schematic representation of a partial enlarged view of a rock 10 that includes a newly formed fracture 12. Each surface 14 has asperities and a rough jagged edge. In the unloaded state illustrated in FIG. 1A, the asperities are mismatched and there is a gap or aperture between the fracture surfaces 14. Under reservoir conditions or in situ, the rock 10 is subjected to an effective stress (reservoir pressure) that is the difference between overburden and reservoir pore pressure. In FIG. 1B, the rock is subjected to an effective stress $\sigma_E$ and the asperities deform as the surfaces 14 are moved together. In FIG. 1C, the rock 10 is subjected to an even larger effective stress $\sigma_E$ that causes the gap to close. Depending on the magnitude of the effective stress $\sigma_E$, the asperities may plastically and elastically deform. Elastic deformation is reversed when the effective stress $\sigma_E$ is released. In contrast, plastic deformation is permanent. Since fluid travels more easily through the fracture aperture than the pores of the rock, the size of the aperture or gap and thus the effective stress $\sigma_E$ influence the permeability of the rock.

Figure 2:
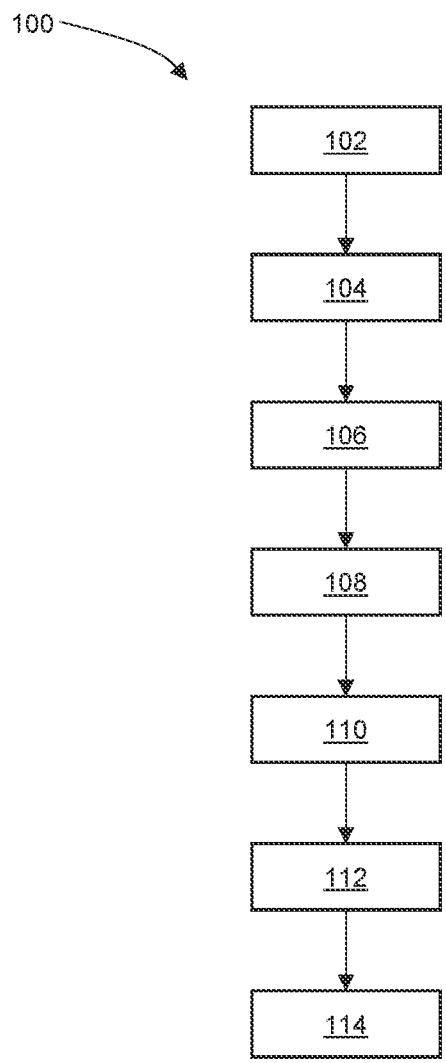
FIG. 2 is a flowchart of an analysis method for a fractured rock sample according to an implementation.

Referring to FIG. 2, a method 100 of analyzing a rock sample from a hydrocarbon reservoir according to an implementation is shown. The method 100 includes subjecting 102 the rock sample to a first effective stress without exceeding a reservoir pressure of the hydrocarbon reservoir; measuring 104 a first permeability of the sample at the first effective stress; increasing 106 the effective stress on the sample to a second effective stress without exceeding the effective stress under reservoir conditions; measuring 108 a second permeability of the sample at the second effective stress; reducing 110 the effective stress on the sample from the second effective stress to a third effective stress without exceeding the effective stress under reservoir conditions; measuring 112 a third permeability of the sample at the third effective stress; and distinguishing 114 between a natural fracture and an artificial fracture in the sample based on the first and third permeabilities.

In some implementations, the first effective stress and the second effective stress are the difference between a pressure applied to the sample and a pore pressure of the sample. The pore pressure is the pressure of fluid in the pore space of the sample. For example, the effective stress may be applied to the sample by placing the sample under pressure in a pressure chamber or vessel. In some implementations, the sample may be cut into an appropriate shape for consistently applying pressure, e.g., a cylindrical plug.

At 102, the rock sample is subjected to a first effective stress without exceeding reservoir pressure of the hydrocarbon reservoir. For example, the first effective stress may eliminate the leakage of testing fluid at the sample side surface along the longitudinal direction. In some implementations, the first effective stress is between about 2.76 MPa (400 psi) and 4.14 MPa (600 psi), for example, about 3.45 MPa (500 psi).

At 104, a first permeability of the sample is measured at the first effective stress. In some implementations, measuring the first permeability of the sample includes measuring the permeability of the sample using a pressure pulse decay method.

At 106, the effective stress on the sample is increased to a second effective stress without exceeding the effective stress under reservoir conditions of the hydrocarbon reservoir. In some implementations, the second effective stress is at least 80% and at most 100% of the effective stress under reservoir conditions. In some implementations, increasing the effective stress on the sample to the second effective stress may include maintaining a constant pore pressure of the sample. For example, before permeability measurements, test fluids are pumped at a specified pressure into the rock sample and fluid pressure at the sample inlet and outlet is monitored by pressure transducers. The sample is allowed to rest for several hours or even days until the pressure reaches equilibrium in the sample or pump flow stops. In this case, the pore pressure within the sample is the specified pressure. When measuring the permeability, pore pressure is generally increased by a small percentage of the initial, specified pore pressure as fluid is permitted to flow from the inlet to the outlet. Because the pressure disturbance is small during the permeability measurement, the pore pressure is considered to be nearly constant.

At 108, a second permeability of the sample is measured at the second effective stress, for example, after the system has reached equilibrium. In some implementations, measuring the second permeability of the sample includes measuring the permeability of the sample using the pressure pulse decay method. In other implementations, the method of measuring permeability is the same for the first and second permeabilities.

At 110, the effective stress on the sample is reduced from the second effective stress to a third effective stress without exceeding the effective stress under reservoir conditions of the hydrocarbon reservoir. In general, the third effective stress is the same as the first effective stress.

At 112, a third permeability of the sample is measured at the third effective stress. In some implementations, the third permeability is measured using the same method as the first permeability and the second permeability. In some implementations, no further permeability measurements beyond the first, second, and third permeabilities need be taken, i.e., exactly three permeability measurements need to be taken at the first, the second, and the third permeabilities.

At 114, it is distinguished between a natural fracture and an artificial fracture in the sample based on the first and third permeabilities. For example, the first permeability, the second permeability, and the third permeability are schematically plotted as points A, B, and C in FIGS. 3A and 3B. The X-axis represents the effective stress $\sigma_E$. The values for the first, second, and third effective stress are marked along the X-axis. The logarithmic values for the measured permeability k at points A, B, and C are plotted along the Y-axis. Referring again to FIG. 1A to 1C, when the effective stress is increased from the first effective stress $\sigma_1$ to the second effective stress $\sigma_2$ (A to B), the size of the fracture aperture and the sample's permeability decrease. The effective stress is then decreased without having exceeded the effective stress under reservoir conditions. When the effective stress returns to third effective stress $\sigma_3$ from the second effective stress $\sigma_2$ (B to C), the relaxation causes the fracture to slightly reopen, and the sample's permeability increases again. The path A to B and the path B to C represent "loading" and "unloading," respectively. Unloading recovers some but not all of the reduction in permeability. In other words, the permeability measurements exhibit hysteresis in the loading-unloading process. Throughout the loading-unloading path, the effective stress $\sigma_E$ on the sample does not exceed the effective stress under reservoir conditions.

Figure 3A:
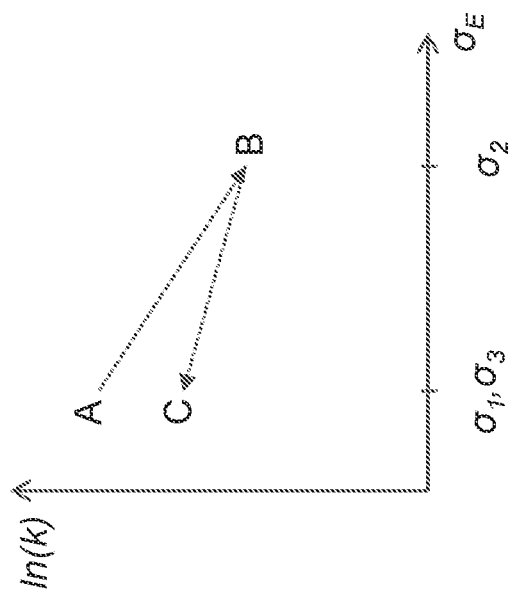
FIGS. 3A and 3B are schematic representations of the relationship between permeability and effective stress for different types of fractures.
Figure 3B:
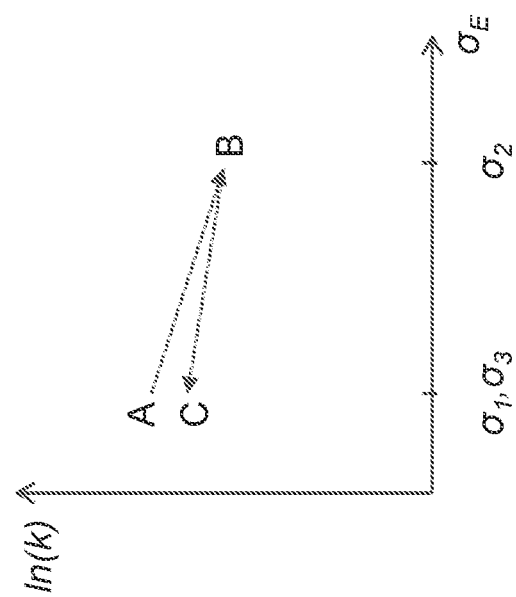

In FIG. 3A, a large portion of the reduction in permeability is recovered during unloading. This is the case for natural fractures that have asperities or fracture surfaces that have already undergone plastic deformation under reservoir conditions. For such samples, loading and unloading generally cause elastic deformations of the fracture surfaces that largely reverses during unloading. In contrast, FIG. 3B illustrates an induced fracture that did not exist under reservoir conditions. During loading, the asperities deform plastically and elastically, resulting in a greater reduction in permeability. Since plastic deformation is permanent, less of the initial permeability is recovered during unloading. This difference in permeabilities may be used to distinguish between a natural fracture and an artificial fracture in the rock sample.

For example, a permeability index PI can be calculated as follows:

$$PI = \frac{k_A - k_C}{k_C}$$

where $k_A$ is the first permeability (Point A in FIG. 3), and $k_C$ is the third permeability (Point C in FIG. 3). Other implementations of the method may be based on a simple difference between the permeability values $k_A$, $k_C$ or a ratio of the values. In some implementations, the permeability index may be compared to a predetermined threshold. For example, indexes below the threshold may indicate a naturally fractured sample, and indexes above the threshold may indicate an artificially fractured sample. In some examples, the threshold may be 0.5 or 50%. Instead of using a threshold value, the method may be repeated for several samples, and the change in permeability is compared across the samples to distinguish natural and induced fractures.

The effectiveness of such approaches has been confirmed experimentally:

Five core plugs of shale that include structures known to have induced fractures were subjected to the loading-unloading process described above. The samples were permeability tested using the pressure pulse decay method at a first effective stress of 3.45 MPa (500 psi), a second, maximum effective stress of 13.79 MPa (2000 psi), and a third effective stress of 3.45 MPa (500 psi). The pore pressure of the samples was maintained at 17.24 MPa (2500 psi).

Two of the samples (Samples 4 and 5) were subject to additional loading prior to the permeability measurements to mimic the effect of stress under reservoir conditions. More specifically, the samples were loaded with an effective stress of 13.79 MPa (2000 psi). The effective stress was then reduced to 3.45 MPa (500 psi) to mimic the stress release that naturally occurs when the rock is taken to the surface from the subsurface reservoir. Samples 1 to 3 were not subjected to this treatment prior to the permeability measurements.

A permeability index was calculated for each sample according to the equation above:

| Sample | Permeability Index (PI) |
|---|---|
| 1 | 115% |
| 2 | 103% |
| 3 | 96% |
| 4 | 20% |
| 5 | 26% |

The pre-treatment of Samples 4 and 5 is thought to cause the plastic deformation of the asperities that results under reservoir conditions. During permeability measurement, they were only subjected to elastic deformation. Accordingly, the change in permeability values expressed by the permeability index is much lower for Samples 4 and 5 than for Samples 1 to 3. In this example, an index value of 50% may be used as a cutoff to distinguish between natural and induced fractures.

Some implementations may include preparation of the sample. Depending on the size of the core sample, smaller core plugs may be cut from it. For example, core plugs may have a cylindrical shape with a diameter of 2.5 to 3.8 cm and a length of 2.5 to 5 cm. The sample is cleaned to remove mobile liquids such as oil and water. In some implementations, cleaning may involve the use of solvents. After cleaning, the sample may be dried. During the preparation process, the sample is not exposed to an effective stress that is larger than the first effective stress to prevent the formation of additional cracks. For example, the samples are generally not placed under confining stress during sample preparation. Before or after the sample is cleaned and dried, the sample may be scanned using computer tomography (CT scanning) to check for fractures. Alternatively, the method may be performed on a sample that with visible fractures.

Figure 4:
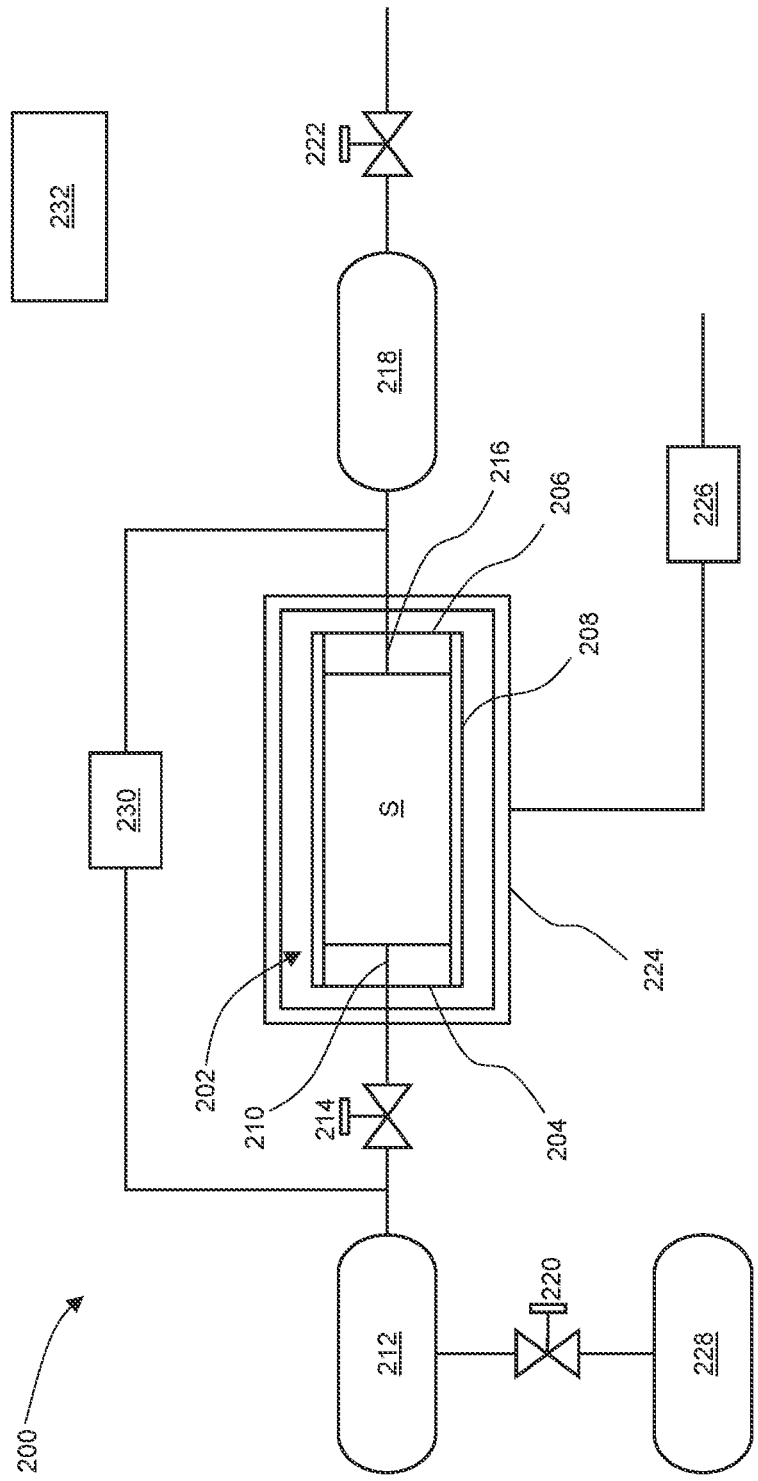
FIG. 4 is a schematic overview of a system for testing the permeability of a core plug sample according to an implementation.

A schematic overview of a system 200 for measuring the permeability of a core plug sample S is described in reference to FIG. 4.

The system 200 includes a core holder 202 that holds the sample S and includes first and second end plates 204, 206 and a sheath 208. The sheath 208 surrounds the sample S and is made of a flexible and impermeable material, e.g., rubber. The ends of the sheath 208 are sealed to a respective end plate 204, 206. The end plates 204, 206 may be made of metal. The first end plate 204 includes a passage 210 that connects the sample S to a first gas reservoir 212 via a first valve 214. The second end plate 206 includes a passage 216 that connects the sample S to a second gas reservoir 218. The first and second gas reservoirs 212, 218 contain a working fluid, for example, a non-reactive gas, such as nitrogen. When the first valve 214 is opened and second and third valves 220, 222 are shut, the reservoirs 212, 218 and the pore pressure of the sample S equilibrate.

In an implementation, the effective stress applied to the rock sample is the difference between a confining pressure and the pore pressure. For example, the core holder 202 in FIG. 4 may be enclosed in a pressure vessel 224 filled with a confining fluid, such as mineral oil. The pressure of the confining fluid is maintained by a pressure vessel control unit 226. The pressure vessel control unit 226 may include a pump that pumps the confining fluid into the pressure vessel 224 from an external source (not shown) and a pressure sensor that measures the fluid pressure inside the pressure vessel 224. Due to the flexible material of the sheath 208, the confining fluid applies pressure to the sample S that can mimic the effective stress placed on the sample S in the reservoir (in situ).

Once the effective stress is applied, the permeability of the sample may be determined as follows. The sample S is initially isolated from the first gas reservoir 212 by closing the valve 214. Next, the second valve 220 is temporarily opened to inject a predetermined amount of working fluid into the first gas reservoir 212 from an external source 228, for example, a gas canister. At this point, there is a difference in pressure between the first and second gas reservoirs 212, 218 that is measured by a differential pressure transmitter 230. Alternatively, a differential pressure transducer or individual pressure sensors for the first and second reservoirs 212, 218 may also be provided.

The first valve 214 is then opened to reconnect the first and second gas reservoirs 212, 218 and the sample S. The working fluid then flows through the sample S. Since the gas pressure in the first reservoir 212 is higher than the pore pressure of the sample S and the second gas reservoir, a pressure pulse is created that gradually decays over time as the reservoirs 212, 218 and the sample S equilibrate. During the transition, the pressure is measured to create one or more time-pressure curves that can be analyzed to calculate a value for the permeability of the sample S. The described process corresponds to the so-called pressure pulse decay method. However, instead of a pressure pulse, a small sinusoidal pressure wave with constant amplitude and frequency may be generated in the first reservoir 212 and propagated through the sample S in the so-called oscillating pressure pulse method.

During the permeability measurement, the effective stress is greater than zero in order to prevent the working fluid from bypassing the sample S and flowing through the confining fluid in the pressure vessel 224. For example, an effective stress of 3.45 MPa (500 psi) ensures flow of the working fluid through the sample S and is unlikely to fracture the sample S. However, other values for the effective stress are also possible, in particular 2.41 MPa, 2.76 MPa, 3.10 MPa, and 3.79 MPa (350 psi, 400 psi, 450 psi, and 550 psi). In some implementations, the effective stress may fall into a range defined by any of the previously mentioned values.

In some implementations, the effective stress on the sample may be increased to a value about equal to or less than the effective stress on the sample under reservoir conditions. In some implementations, the effective stress may be equal to about 13.79 MPa (2000 psi). If the effective stress under reservoir conditions is lower than 13.79 MPa (2000 psi), the effective stress can be reduced accordingly. During the permeability measurements, the effective stress applied to the sample generally remains below the effective stress on the sample under reservoir conditions to prevent the further plastic deformation or the formation of additional fractures or the propagation of existing fractures that may occur at higher levels of effective stress. In some implementations, increasing the effective stress on the sample may include increasing the confining pressure and maintaining a constant pore pressure of the sample. For example, maintaining a constant pore pressure may avoid the effects of diffusion and slippage flow. For example, the pore pressure may be set to and maintained at about 17.24 MPa (2500 psi) throughout the permeability measurements.

In an implementation, the testing system 200 may include a controller 232 that controls one or more of the valves 214, 220, 222, the differential pressure transmitter 230, or the pressure vessel control unit 226 to automatically conduct pressure pulse decay tests at different levels of effective stress. For example, the controller 232 may be a computer system that includes at least one hardware processor and a non-transitory computer-readable storage medium coupled to the at least one hardware processor and storing programming instructions for execution by the at least one hardware processor, wherein the programming instructions, when executed, cause the testing system to perform the method according to any of the implementations in this disclosure. In some implementations, the computer system may include a graphical user interface for presenting the results of the analysis to the user. In some implementations, the computing system can include clients and servers that are generally remote from each other and communicate over a network. Although a single controller 232 is illustrated in FIG. 4, in other implementations, control of the valves 214, 220, 222, the differential pressure transmitter 230, or the pressure vessel control unit 226 may be performed by separate controllers (not shown).

The described method identifies the fracture types based on the different permeability-hysteresis behavior of unconventional rock samples with induced and natural fractures, respectively. If the permeability measurements show relatively large hysteresis, the fractures in the sample are considered to be induced fractures. Otherwise, they are identified as natural fractures. Although the permeability measurements are described in relation to the pulse pressure decay method and oscillating pressure pulse method, other methods of measuring permeability, such as the steady-state method, may also be used. When permeability is measured with steady-state method, one maintains the fixed pressure values in the first and second gas reservoirs 212, 218. The pressure in upstream reservoir 212 is higher than downstream reservoir 218, and then flow occurs from 212 to 218 through sample S. The flow rate from reservoir 212 to sample S and the flow rate from sample S to reservoir 218 are also measured. When the difference between the two flow rates is less than 1% of the flow rate from the reservoir 212 to sample S, the steady state flow is reached. Then permeability can be determined based on Darcy's Law using the flow rate from reservoir 212 to sample S and pressure differences between the two reservoirs.

If fractures in a rock sample are natural, laboratory permeability measurements are more representative of reservoir permeability. If fractures are induced, laboratory permeability measurements will significantly overestimate the reservoir permeability. The measured permeability can be provided as an input variable to a geophysical model (a computer-generated model or otherwise). The input variable will be more accurate and the predictions of the geophysical models will be more accurate if the permeability measurements are representative of actual reservoir conditions.

Described implementations of the subject matter can include one or more features, alone or in combination.

For example, in a first implementation, a method of analyzing a rock sample from a hydrocarbon reservoir includes: subjecting the rock sample to a first effective stress without exceeding the effective stress under reservoir conditions of the hydrocarbon reservoir; measuring a first permeability of the sample at the first effective stress; increasing the effective stress on the sample to a second effective stress without exceeding the effective stress under reservoir conditions of the hydrocarbon reservoir; measuring a second permeability of the sample at the second effective stress; reducing the effective stress on the sample from the second effective stress to a third effective stress without exceeding the effective stress under reservoir conditions of the hydrocarbon reservoir; measuring a third permeability of the sample at the third effective stress; and distinguishing between a natural fracture and an artificial fracture in the sample based on the first and third permeabilities.

For example, in a second implementation, a non-transitory computer-readable medium stores instructions which, when executed, cause a computer system to perform operations including: obtaining a first permeability measurement of a rock sample from a hydrocarbon reservoir at a first effective stress without exceeding the effective stress under reservoir conditions of the hydrocarbon reservoir; obtaining a second permeability measurement of the sample at a second effective stress without exceeding the effective stress under reservoir conditions of the hydrocarbon reservoir, wherein the second effective stress is greater than the first effective stress; obtaining a third permeability measurement of the sample at a third effective stress without exceeding the effective stress under reservoir conditions of the hydrocarbon reservoir, wherein the third effective stress is less than the second effective stress; and distinguishing between a natural fracture and an artificial fracture in the sample based on the first and third permeability measurements.

For example, in a third implementation, a system includes a permeability measuring device configured to subject a rock sample to an effective stress and to measure the permeability of the rock sample at the effective stress; and a controller connected to the permeability measuring device and configured to cause the permeability measuring device to perform operations comprising subjecting the rock sample to a first effective stress without exceeding a reservoir pressure of the hydrocarbon reservoir, measuring a first permeability of the sample at the first effective stress, increasing the effective stress on the sample to a second effective stress without exceeding the effective stress under reservoir conditions of the hydrocarbon reservoir, measuring a second permeability of the sample at the second effective stress, reducing the effective stress on the sample from the second effective stress to a third effective stress without exceeding the effective stress under reservoir conditions of the hydrocarbon reservoir, measuring a third permeability of the sample at the third effective stress, and distinguishing between a natural fracture and an artificial fracture in the sample based on the first and third permeabilities.

The foregoing and other implementations can each, optionally include one or more of the following features, alone or in combination:

In a first aspect, the second effective stress is about 13.79 MPa.

In a second aspect, the second effective stress is about equal to the effective stress under reservoir conditions if the effective stress under reservoir conditions is less than 13.79 MPa.

In a third aspect, the first and the third effective stress are about 3.45 MPa.

In a fourth aspect, the first effective stress and the third effective stress are equal.

In a fifth aspect, measuring the first, second, and third permeabilities comprises measuring the permeability of the sample using a pressure pulse decay method.

In a sixth aspect, increasing the effective stress on the sample to the second effective stress comprises maintaining a constant pore pressure of the sample and increasing a confining pressure on the sample.

In a seventh aspect, classifying the sample as a naturally fractured or artificially fractured sample comprises calculating a permeability index PI $$PI = \frac{k_A - k_C}{k_c}$$

where $k_A$ and $k_C$ are the first and third permeabilities, respectively, and comparing the permeability index to a threshold, wherein values below the threshold indicate a naturally fractured sample, and values above the threshold indicate an artificially fractured sample.

An eighth aspect optionally includes collecting the fractured rock sample from an unconventional reservoir.

The above description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

What is claimed is:

1. A method of analyzing a rock sample from a hydrocarbon reservoir, the method comprising:
    subjecting the rock sample to a first effective stress without exceeding the effective stress under reservoir conditions of the hydrocarbon reservoir;
    measuring a first permeability of the sample at the first effective stress;
    increasing the effective stress on the sample to a second effective stress without exceeding the effective stress under reservoir conditions of the hydrocarbon reservoir;
    measuring a second permeability of the sample at the second effective stress;
    reducing the effective stress on the sample from the second effective stress to a third effective stress without exceeding the effective stress under reservoir conditions of the hydrocarbon reservoir;
    measuring a third permeability of the sample at the third effective stress; and
    distinguishing between a natural fracture and an artificial fracture in the sample based on the first and third permeabilities.

2. The method of claim 1, wherein the second effective stress is about 13.79 MPa.

3. The method of claim 1, wherein the second effective stress is about equal to the effective stress under reservoir conditions if the effective stress under reservoir conditions is less than 13.79 MPa.

4. The method of claim 1, wherein the first and the third effective stress are about 3.45 MPa.

5. The method of claim 1, wherein the first effective stress and the third effective stress are equal.

6. The method of claim 1, wherein measuring the first, second, and third permeabilities comprises measuring the permeability of the sample using a pressure pulse decay method.

7. The method of claim 6, wherein increasing the effective stress on the sample to the second effective stress comprises maintaining a constant pore pressure of the sample and increasing a confining pressure on the sample.

8. The method of claim 1, wherein classifying the sample as a naturally fractured or artificially fractured sample comprises
    calculating a permeability index PI $$PI = \frac{k_A - k_C}{k_c}$$

where $k_A$ and $k_C$ are the first and third permeabilities, respectively, and
    comparing the permeability index to a threshold, wherein values below the threshold indicate a naturally fractured sample, and values above the threshold indicate an artificially fractured sample.

9. The method of claim 1, further comprising collecting the fractured rock sample from an unconventional reservoir.

10. A non-transitory computer-readable medium storing instructions which, when executed, cause a computer system to perform operations comprising:
    obtaining a first permeability measurement of a rock sample from a hydrocarbon reservoir at a first effective stress without exceeding the effective stress under reservoir conditions of the hydrocarbon reservoir;
    obtaining a second permeability measurement of the sample at a second effective stress without exceeding the effective stress under reservoir conditions of the hydrocarbon reservoir, wherein the second effective stress is greater than the first effective stress;
    obtaining a third permeability measurement of the sample at a third effective stress without exceeding the effective stress under reservoir conditions of the hydrocarbon reservoir, wherein the third effective stress is less than the second effective stress; and
    distinguishing between a natural fracture and an artificial fracture in the sample based on the first and third permeability measurements.

11. The non-transitory computer-readable medium of claim 10, wherein the second effective stress is about 13.79 MPa.

12. The non-transitory computer-readable medium of claim 10, wherein the second effective stress is about equal to the effective stress under reservoir conditions if the effective stress under reservoir conditions is less than 13.79 MPa.

13. The non-transitory computer-readable medium of claim 10, wherein the first and the third effective stress are about 3.45 MPa.

14. The non-transitory computer-readable medium of claim 10, wherein the first effective stress and the third effective stress are equal.

15. The non-transitory computer-readable medium of claim 10, wherein measuring the first, second, and third permeabilities comprises measuring the permeability of the sample using a pressure pulse decay method.

16. The non-transitory computer-readable medium of claim 10, wherein classifying the sample as a naturally fractured or artificially fractured sample comprises
    calculating a permeability index PI $$PI = \frac{k_A - k_C}{k_c}$$

where $k_A$ and $k_C$ are the first and third permeabilities, respectively, and comparing the permeability index to a threshold, wherein values below the threshold indicate a naturally fractured sample, and values above the threshold indicate an artificially fractured sample.

17. A system comprising
a permeability measuring device configured to subject a rock sample from a hydrocarbon reservoir to an effective stress and to measure the permeability of the rock sample at the effective stress; and
a controller connected to the permeability measuring device and configured to cause the permeability measuring device to perform operations comprising
subjecting the rock sample to a first effective stress without exceeding a reservoir pressure of the hydrocarbon reservoir,
measuring a first permeability of the sample at the first effective stress,
increasing the effective stress on the sample to a second effective stress without exceeding the effective stress under reservoir conditions of the hydrocarbon reservoir,
measuring a second permeability of the sample at the second effective stress,
reducing the effective stress on the sample from the second effective stress to a third effective stress without exceeding the effective stress under reservoir conditions of the hydrocarbon reservoir,
measuring a third permeability of the sample at the third effective stress, and
distinguishing between a natural fracture and an artificial fracture in the sample based on the first and third permeabilities.

18. The system of claim 17, wherein the second effective stress is about 13.79 MPa.

19. The system of claim 17, wherein the second effective stress is about equal to the effective stress under reservoir conditions if the effective stress under reservoir conditions is less than 13.79 MPa.

20. The system of claim 17, wherein the first and the third effective stress are about 3.45 MPa.

* * * * *